(12) United States Patent
Tucker

(10) Patent No.: US 11,161,459 B1
(45) Date of Patent: Nov. 2, 2021

(54) ADJUSTABLE SEAT TRAY

(71) Applicant: Clem Tucker, Elk Horn, KY (US)

(72) Inventor: Clem Tucker, Elk Horn, KY (US)

( * ) Notice: Subject to any disclaimer, the term of this patent is extended or adjusted under 35 U.S.C. 154(b) by 0 days.

(21) Appl. No.: 16/887,687

(22) Filed: May 29, 2020

(51) Int. Cl.
*B60R 7/04* (2006.01)
*B60R 11/00* (2006.01)

(52) U.S. Cl.
CPC ....... *B60R 7/043* (2013.01); *B60R 2011/0012* (2013.01); *B60R 2011/0043* (2013.01); *B60R 2011/0075* (2013.01); *B60R 2011/0082* (2013.01); *B60R 2011/0084* (2013.01)

(58) Field of Classification Search
CPC ............ B60R 7/043; B60R 2011/0012; B60R 2011/0082; B60R 2011/0084; B60R 2011/0075; B60N 3/002
USPC .................................. D12/416, 425; D6/574
See application file for complete search history.

(56) References Cited

U.S. PATENT DOCUMENTS

| | | | | |
|---|---|---|---|---|
| 729,078 A * | 5/1903 | Maxwell | ............... | B65D 21/086 220/8 |
| 2,503,602 A * | 4/1950 | Titley | ..................... | B60N 2/345 5/94 |
| 2,554,685 A * | 5/1951 | St Denis | ................. | B60N 3/002 108/45 |
| 2,717,816 A * | 9/1955 | Turner | ................... | B60N 3/002 108/45 |
| 2,741,521 A * | 4/1956 | Bell | ....................... | B60N 3/004 108/135 |
| 2,790,184 A * | 4/1957 | Testa | ........................ | B60P 3/04 5/118 |
| 3,288,187 A * | 11/1966 | Wheaton | ................ | B60N 3/044 220/571 |
| 3,318,456 A * | 5/1967 | Lipe | ........................ | B60N 3/002 211/72 |
| 3,326,446 A * | 6/1967 | Goings | .................. | A47B 31/06 206/563 |
| 3,338,629 A * | 8/1967 | Drees | ...................... | B60R 7/043 312/235.8 |
| D257,296 S * | 10/1980 | White | .......................... | D12/425 |
| 4,300,709 A | 11/1981 | Page, Jr. | | |
| 4,512,503 A * | 4/1985 | Gioso | ..................... | B60R 7/043 206/216 |
| D280,960 S * | 10/1985 | Dodd | ............................. | D7/549 |
| D282,335 S * | 1/1986 | Dodd | .......................... | D7/553.2 |
| 4,813,751 A * | 3/1989 | Fenn | ...................... | B60R 7/043 108/44 |
| 4,832,241 A | 5/1989 | Radcliffe | | |
| D309,059 S * | 7/1990 | Bledsoe | ....................... | D12/425 |
| D310,303 S * | 9/1990 | Colletti | ....................... | D12/425 |
| D311,292 S * | 10/1990 | Ennis, Jr. | ..................... | D12/425 |

(Continued)

*Primary Examiner* — Justin M Larson
(74) *Attorney, Agent, or Firm* — Sanchelima & Associates, P.A.; Christian Sanchelima; Jesus Sanchelima

(57) ABSTRACT

A seat tray for a vehicle is disclosed herein. The tray holds items and prevents items from falling off the seat. The tray may include a bottom and sidewalls creating a holding area. In one version, the tray be adjustable in length and/or width. The tray may be secured to the seat with an extended tail-end at the bottom configured to slide under the seat between the cushions. In some variations, the tail-end may include a wrinkle-like ridge to prevent items from sliding under the seat. The tray may be used to hold various items needed by a driver who often drives over long distances.

8 Claims, 4 Drawing Sheets

(56) References Cited

U.S. PATENT DOCUMENTS

| | | | | |
|---|---|---|---|---|
| 5,016,772 A | * | 5/1991 | Wilk | B65D 21/086 220/495.01 |
| 5,083,827 A | * | 1/1992 | Hollenbaugh, Sr. | B60R 13/01 220/4.08 |
| 5,139,186 A | * | 8/1992 | Loew | B60R 11/00 206/3 |
| 5,140,914 A | * | 8/1992 | Bohbot | A47C 7/705 108/44 |
| 5,149,032 A | * | 9/1992 | Jones | A47G 23/0225 248/154 |
| 5,160,026 A | * | 11/1992 | Marsh | B25H 3/022 206/373 |
| 5,249,724 A | * | 10/1993 | Green | B60R 7/043 220/771 |
| 5,253,791 A | * | 10/1993 | Chiodo | B60R 7/043 211/135 |
| 5,370,060 A | * | 12/1994 | Wang | B60N 3/004 108/149 |
| D358,578 S | * | 5/1995 | Walker | D12/416 |
| D371,109 S | * | 6/1996 | Schlattl | D12/425 |
| D380,190 S | * | 6/1997 | Slayter | D12/425 |
| D380,727 S | * | 7/1997 | Gilstrap | D12/417 |
| 5,720,458 A | * | 2/1998 | Carpenter | B60N 3/103 224/275 |
| D427,139 S | * | 6/2000 | Noval | D12/419 |
| 6,279,798 B1 | * | 8/2001 | Partch | A01K 1/0272 224/275 |
| D454,533 S | * | 3/2002 | Benson | D12/425 |
| D458,209 S | * | 6/2002 | Darbishire | D12/221 |
| 6,467,622 B1 | * | 10/2002 | Hull | A47B 88/969 206/553 |
| 7,398,737 B1 | * | 7/2008 | Martellaro | B60N 3/001 108/143 |
| 7,966,949 B2 | * | 6/2011 | Willey | B60N 3/002 108/44 |
| 8,091,486 B1 | * | 1/2012 | Broaddrick | A47G 23/0633 108/43 |
| 9,609,845 B2 | * | 4/2017 | Hartelius | B60R 22/10 |
| D795,789 S | * | 8/2017 | Ehtesham | D12/425 |
| D845,875 S | * | 4/2019 | Bookman | D12/416 |
| D856,264 S | * | 8/2019 | Kemerer | D12/416 |
| 10,625,649 B2 | * | 4/2020 | Buchanan | A47B 17/03 |
| D884,578 S | * | 5/2020 | Guo | D12/425 |
| 2007/0152000 A1 | * | 7/2007 | Franzi | F16M 11/10 224/275 |
| 2008/0264987 A1 | * | 10/2008 | Sarro | B60R 7/043 224/275 |
| 2011/0114686 A1 | * | 5/2011 | Franzi | F16M 13/02 224/275 |
| 2011/0278334 A1 | * | 11/2011 | Aadahl | B60R 7/043 224/275 |
| 2014/0252810 A1 | * | 9/2014 | Whalen | B60N 3/002 297/135 |
| 2017/0008439 A1 | * | 1/2017 | DiFiore | B60R 11/00 |
| 2019/0029217 A1 | * | 1/2019 | Ryan | A01K 1/0272 |
| 2019/0061142 A1 | * | 2/2019 | Kitowski | B65D 21/086 |
| 2019/0210500 A1 | * | 7/2019 | Brown | B60N 2/206 |

\* cited by examiner

ADJUSTABLE SEAT TRAY

BACKGROUND OF THE INVENTION

1. Field of the Invention

The present invention relates to a tray that is mounted onto a seat and, more particularly, to a telescopic tray that is mounted onto the passenger seat of a vehicle.

2. Description of the Related Art

Several designs for a seat tray have been designed in the past. None of them, however, include a tray, particularly for a vehicle seat, that holds items and prevents items from falling off the seat. The tray may include a bottom and sidewalls creating a holding area. In one version, the tray be adjustable in length and/or width. The tray may be secured to the seat with an extended tail-end at the bottom configured to slide under the seat between the cushions. In some variations, the tail-end may include a wrinkle-like ridge to prevent items from sliding under the seat. The tray may be used to hold various items needed by a driver who often drives over long distances. It is known that individuals who often drive for long periods of time such as truck drivers often need to have an additional compartment to hold various components and items while driving. These items may include things like food such as pizza and snacks, cleaning items, and laptops and the like. Having a seat tray allows a driver to have these items readily available while they are driving. Therefore, there is a need for a seat tray to allow a user to store various items and food while they are driving. The device will aid users who drive long distances to have various items readily available. Additionally, the tray may also hold paperwork pertinent to a driver that they would have readily available while driving.

Applicant believes that a related reference corresponds to U.S. Pat. No. 4,300,709 issued for an automobile console. The cited disclosure comprises an automobile console which is adapted to hold various articles in an organized fashion adjacent the driver or passenger. Applicant believes that another related reference corresponds to U.S. Pat. No. 4,832,241 issued for a vehicle portable-office organizer. The cited disclosure comprises a vehicle portable organizer designed to be detachably mounted to the passenger seat of a vehicle. The organizer consists of a tray sized to accept a tray insert that can be divided into a selectable quantity of smaller trays by dividers selected from a divider set. However, the cited references differ from the present invention because the collectively fail to address the tray with and adjustable length and width and a tail end having a ridged portion to secure to the cushions of a seat. The present invention addresses these issues by providing these elements in and efficient and novel configuration.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an adjustable seat tray that allows drivers who drive long distances to efficiently store items and food for later use.

It is another object of this invention to provide an adjustable seat tray that is telescopic in nature allowing the area of the tray to be adjustable to fit any seat of a vehicle.

It is still another object of the present invention to provide an adjustable seat tray that allows a driver to maintain focus on the road while still having various items readily available.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
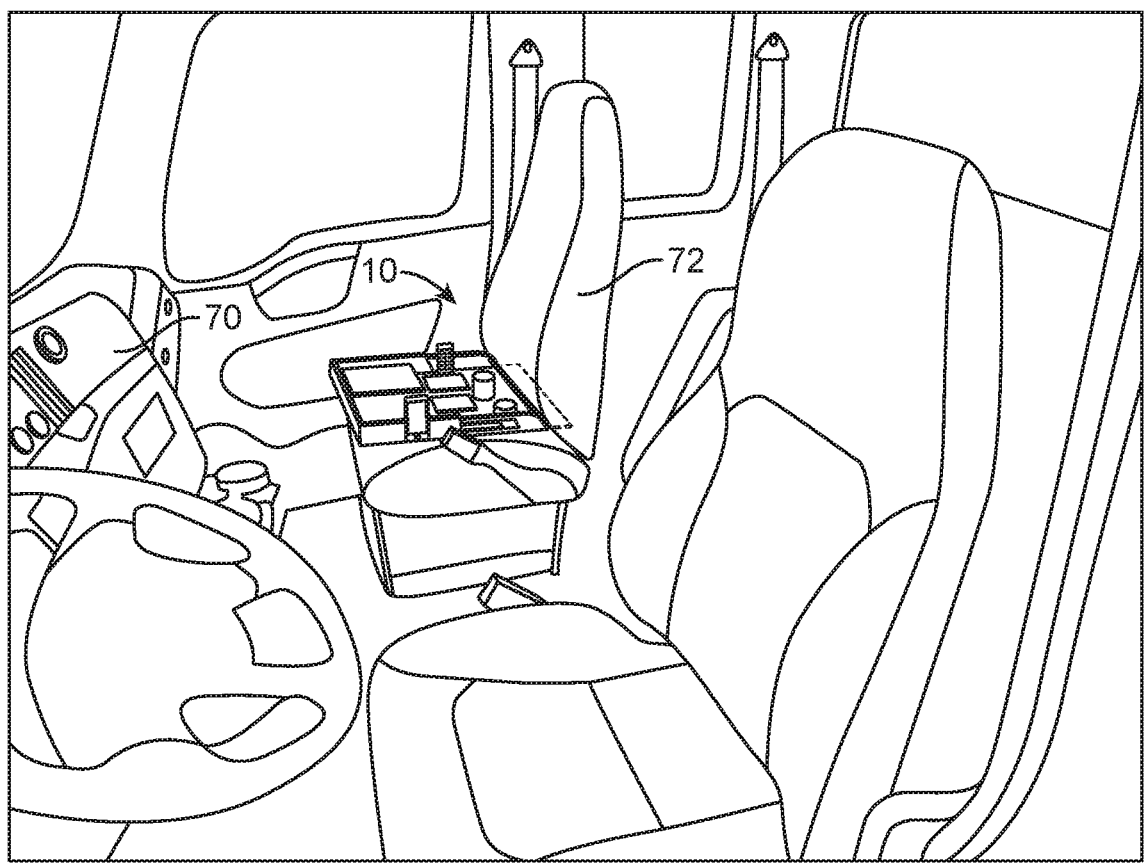
FIG. 1 represents an isometric operational view of vehicle seat tray 10 in accordance to an embodiment of the present invention.

Referring now to the drawings, where the present invention is generally referred to with numeral 10, it can be observed a vehicle seat tray 10 which basically includes a tray assembly 20, a telescopic assembly 40, and a tail end assembly 60.

Figure 2:
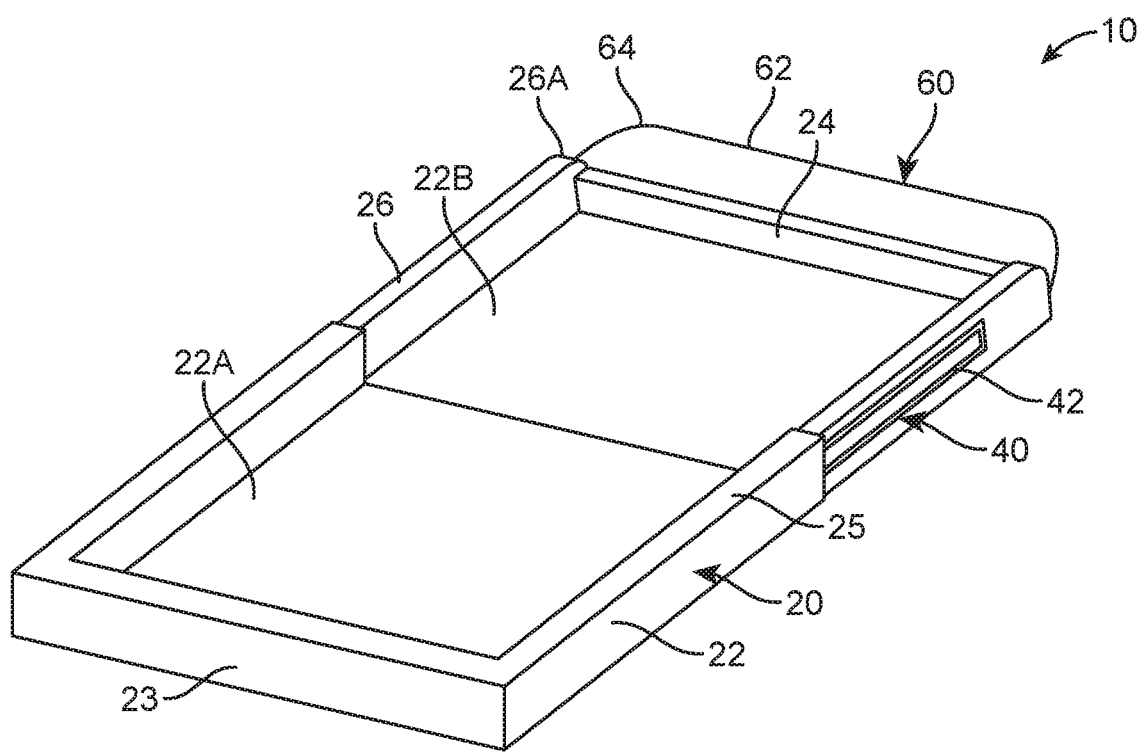
FIG. 2 shows an isometric view of vehicle seat tray 10 having tray assembly 20, telescopic assembly 40, and tail end assembly 60 in accordance to an embodiment of the present invention.

Tray assembly 20 includes a tray 22 having a first tray portion 22A and a second tray portion 22B. In one embodiment, tray 22 is made of a wooden material. Other embodiments may feature a tray 22 being made of other suitable materials such as metal, carbon fiber, and the like. Additionally, tray 22 may resemble the shape of a traditional tray and include sidewalls and a bottom to form a holding area. In one implementation, first tray portion 22A is a rectangular tray member having a front sidewall 23 and first sidewalls 25. First sidewalls 25 may be parallel sidewalls as seen in FIG. 2. In the present embodiment, the height of front sidewall 23 and first sidewalls 25 are the same height. Other embodiments may feature a front sidewall 23 and first sidewalls 25 having varying heights. Second tray portion 22B includes a back sidewall 24 and second sidewalls 26. In one embodiment, second tray portion 22B is provided in dimensions significantly less than that of first tray portion 22A. Additionally, just as first tray portion 22A second sidewalls 26 may be provided as parallel side walls. In the present embodiment, back sidewall 24 is provided having a height that is less than the height provided for front sidewall 23. Furthermore, second tray portion 22B also includes a bottom surface also used to hold items therein. In one implementation, second sidewalls 26 include a back most end which includes a curved portion 26A. Curved portion 26A represents a distal end of the sidewall that curves and extends over the back sidewall 24. This configuration provides protection to any surface that may come in contact with this back most end. Should these ends be sharp, the distal end may then poke and damage the surface it is in contact with. Curved portion 26A removes this potential damage and allows the distal end to come into contact with various surfaces.

Figure 3:
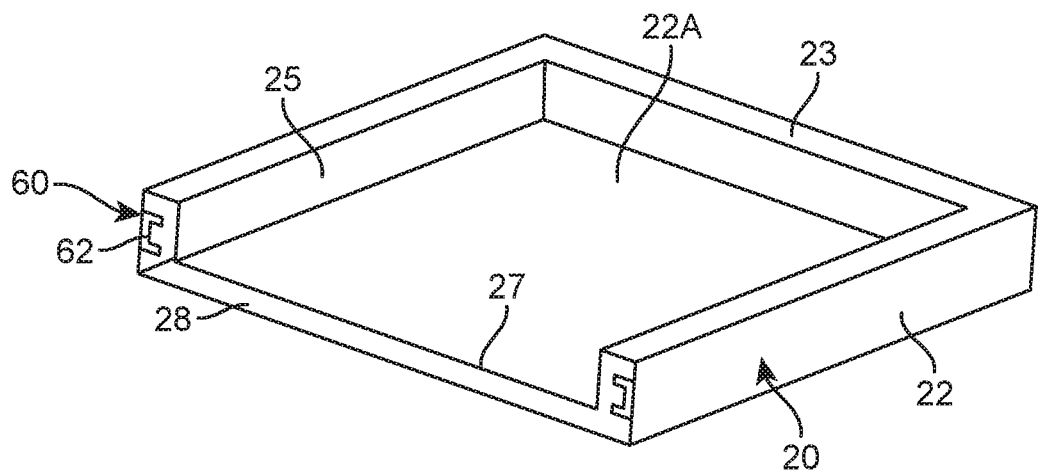
FIG. 3 illustrates an isometric view of first tray portion 22A of tray 22 in accordance to an embodiment of the present invention.
Figure 4:
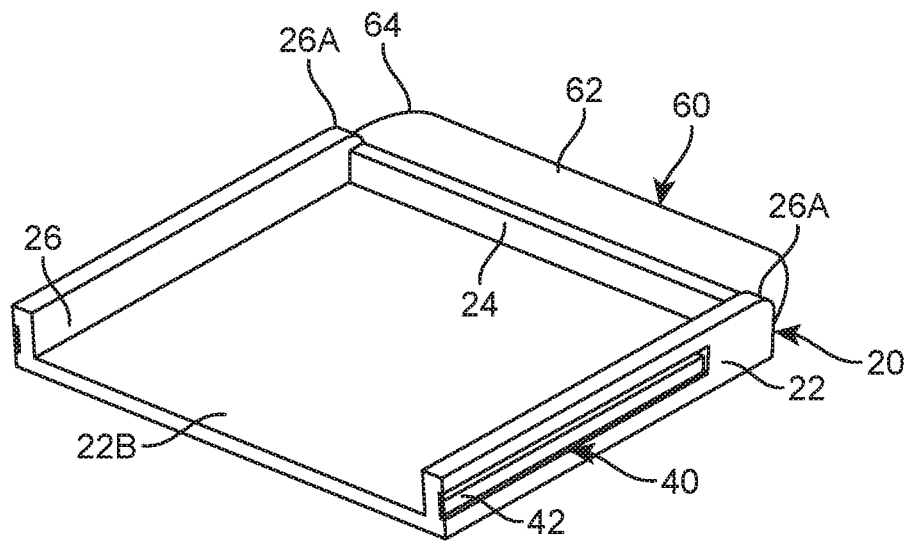
FIG. 4 is a representation of an isometric view of second tray portion 22B of tray 22 in accordance to an embodiment of the present invention.
Figure 5:
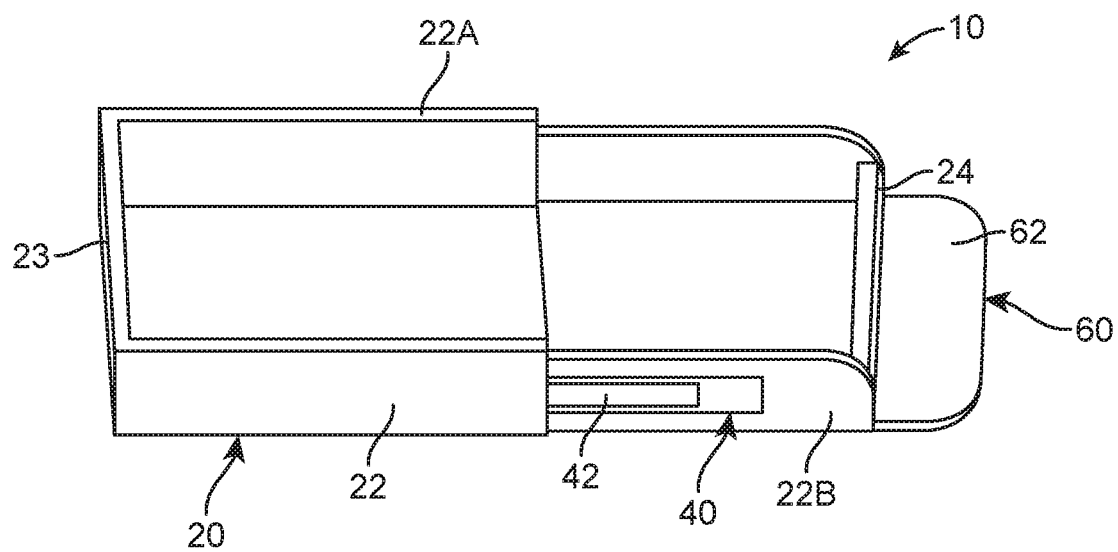
FIG. 5 shows an isometric side view of tray assembly 20 in accordance to an embodiment of the present invention.

First tray portion 22A further includes an interior space 27 that is accessed through an opening 28. In one embodiment, interior space 27 extends the entire length within first tray portion 22A. In another embodiment, interior space 27 only partially extends within first tray portion 22A. Interior space 27 must be of suitable dimensions to comfortably receive second tray portion 22B therein. In one implementation, opening 28 is located along a sidewall of first tray portion 22A. This sidewall may be the one that is opposite to front sidewall 23 as depicted in FIG. 3. In the present embodiment, second tray portion 22B is inserted within first tray portion 22A through opening 28 to then form tray 22. As a result, a tray 22 with an adjustable length is formed. This allows tray 22 to be fitted onto a variety of structures and may then be adjusted to suit a user's needs. In one implementation, tray 22 is mounted within a vehicle 70 onto a seat 72. Seat 72 may be provided as a passenger seat located adjacent to a driver's seat. Tray 22 aids in carrying items that are particularly useful for a driver driving long distances such as a truck driver. In one embodiment, these items may include mobile devices such as phones, lights, lamps, and consumable food such as pizza and the like.

Telescopic assembly 40 includes a track member 42 extending partially along an outer side of each of second sidewalls 26. In one embodiment, track member 42 is provided as a drawer slider track member mounted on second sidewalls 26. Other implementations may include other various types of track members known in the art of drawers. Track member 42 may be any suitable track member that enables for an effortless telescopic configuration of tray 22. Other embodiments may feature a track member extending across the entire length of second sidewalls 26. Additionally, track member 42 may also extend within the interior space 27 of first tray portion 22A as seen in FIG. 3. Telescopic assembly 40 allows a user to adjust the length of tray 22 and set it to adjust the area of space needed from tray 22.

Figure 6:
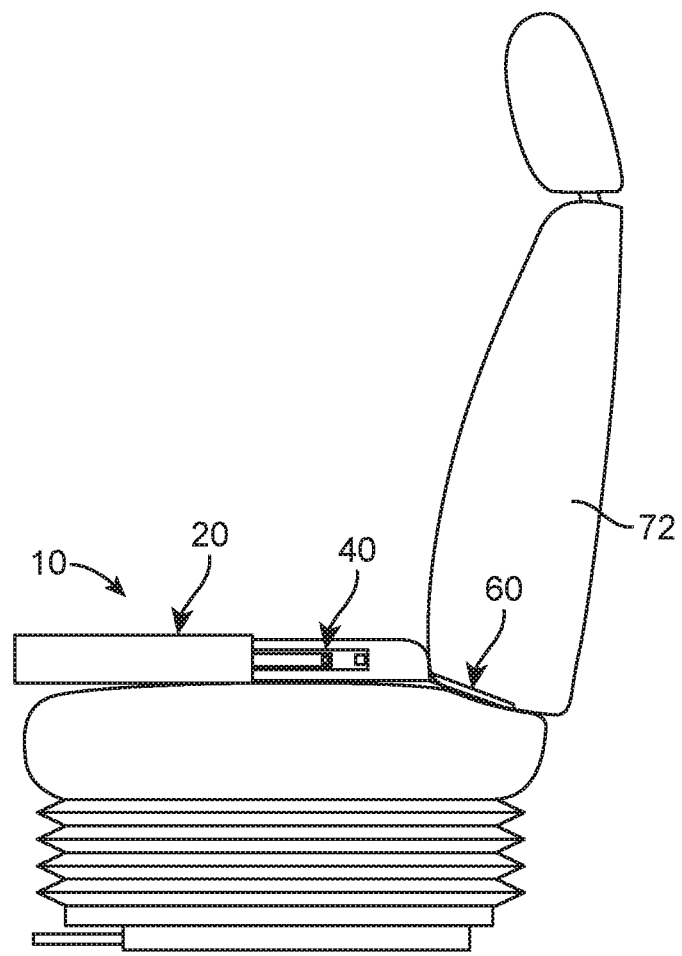
FIG. 6 illustrates an operational side view of vehicle seat tray 10 depicting how it is mounted within a passenger seat of a vehicle.
Figure 7:
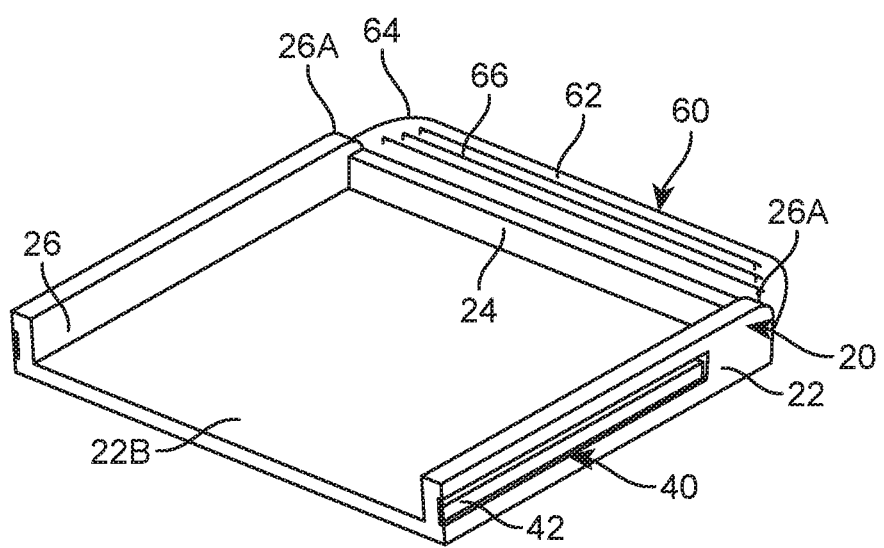
FIG. 7 represents another isometric view of second tray portion 22B of tray 22 depicting wrinkle ridges 66 in accordance to and embodiment of the present invention.

Tail end assembly 60 includes an extended tail end 62 that is integrally mounted to one of the sidewalls of second tray portion 22B. In one embodiment, extended tail end 62 is mounted on an outer side of back sidewall 24. Extended tail end 62 may be provided in the form of a substantially flat member made of the same material as tray 22. Additionally, extended tail end 62 may further include curved sides 64 defining side ends of extended tail end 62 and a straight top edge. In one implementation, extended tail end 62 includes a top end having wrinkle ridges 66 located thereon. Wrinkle ridges 66 may be provided in the form of a triangular ridges mounted in a horizontal configuration along the top end. Additionally, wrinkle ridges 66 allow for a more secure attachment when tray 22 is mounted onto seat 72. In one embodiment, seat 72 is provided as a passenger seat consisting of two cushions. Extended tail end 62 is then inserted into an opening located between these two cushions. Furthermore, wrinkle ridges 66 allow for the extended tail end 62 to then be securely attached within seat 72. This configuration may be observed in FIG. 6 of the provided drawings. In additional implementations, vehicle seat tray 10 may also be provided with additional LED lights and a battery charger built in.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for an adjustable seat tray, comprising:
   a. a tray assembly including a tray having a first and second tray portion, said first and second tray portion including a bottom and sidewalls creating a holding area, wherein said first tray portion includes an interior space and an opening along a sidewall of said first tray portion, said second portion inserted within said first tray portion to create an adjustable length, wherein said tray includes a front side wall and a back sidewall, wherein said back sidewall includes a height lower than said front sidewall;
   b. a telescopic assembly including track members mounted along said sidewalls of said second tray portion, wherein said track members allow said second tray portion to be adjusted by a user; and
   c. a tail end assembly including an extended tail end integrally mounted to one of said sidewalls of said tray, wherein said extended tail end is secured to a seat of a vehicle.

2. The system for an adjustable seat tray of claim 1 wherein said sidewalls of said second tray portion includes a back most end having a curved portion.

3. The system for an adjustable seat tray of claim 1 wherein said track members extend partially along an outer side of said sidewalls of said second tray portion.

4. The system for an adjustable seat tray of claim 1 wherein said track members are drawer slides.

5. The system for an adjustable seat tray of claim 1 wherein said tray holds various items such as mobile devices, lights, and consumables.

6. The system for an adjustable seat tray of claim 1 wherein said seat is a passenger seat adjacent to a driver's seat.

7. The system for an adjustable seat tray of claim 6 wherein said seat includes at least two cushions, said extended tail end being inserted within said two cushions.

8. A system for an adjustable seat tray, comprising:
   a. a vehicle having a passenger seat, said passenger seat having an opening between two cushions of said passenger seat;
   b. a tray assembly including a first tray portion and a second tray portion, wherein said first tray portion is a rectangular tray portion including a front sidewall, first parallel sidewalls, and a first bottom surface, said first tray portion having an interior space therein, said first tray portion having a tray opening located on a back end providing access to said interior space, a second tray portion having a back sidewall, second parallel sidewalls, and a second bottom surface, wherein said second tray portion includes dimensions being less than said first tray portion, wherein said second tray portion is inserted within said interior space through said tray opening, wherein said back sidewall has a height being less than said front sidewall, said second parallel sidewalls having a back most end, said back most end having a radius of curvature extending over said back sidewall;

c. a telescopic assembly including a track member extending partially along an outer side of each of said second parallel sidewalls, wherein said track member is a drawer slide track, wherein said track extends within said first parallel sidewalls of said first tray portion; and d. a tail end assembly including a tail end mounted to a bottom end of said back sidewall, said tail end having two curved sides and a straight top edge, wherein said tail end includes wrinkle ridges on a top end, wherein said tail end is inserted within said opening between said two cushions of said passenger seat.

\* \* \* \* \*